Feb. 5, 1924.

M. E. GATES

MACHINE FOR MAKING TERRA COTTA BLOCKS

Filed July 6, 1920

Inventor.
Major E. Gates,
By Dyrenforth, Lee, Chritton & Niles
Attys.

Feb. 5, 1924.
1,482,646

M. E. GATES

MACHINE FOR MAKING TERRA COTTA BLOCKS

Filed July 6, 1920 7 Sheets-Sheet 4

Inventor.
Major E. Gates,
By Dyrenforth, Lee, Chritton & Wiles
Attys.

Feb. 5, 1924.

M. E. GATES 1,482,646

MACHINE FOR MAKING TERRA COTTA BLOCKS

Filed July 6, 1920   7 Sheets-Sheet 5

Inventor.
Major E. Gates,
By Dyrenforth, Lee, Chritton & Wiles
Attys.

Feb. 5, 1924.

M. E. GATES

MACHINE FOR MAKING TERRA COTTA BLOCKS

Filed July 6, 1920   7 Sheets-Sheet 7

1,482,646

Inventor.
Major E. Gates,
By Dyrenforth, Lee, Chritton & Wiles
Attys.

Patented Feb. 5, 1924.

1,482,646

UNITED STATES PATENT OFFICE.

MAJOR E. GATES, OF TERRA COTTA, ILLINOIS.

MACHINE FOR MAKING TERRA-COTTA BLOCKS.

Application filed July 6, 1920. Serial No. 394,177.

*To all whom it may concern:*

Be it known that I, MAJOR E. GATES, a citizen of the United States, residing at Terra Cotta, in the county of McHenry and State of Illinois, have invented a new and useful Improvement in a Machine for Making Terra-Cotta Blocks, of which the following is a specification.

This invention relates to molding machines and is particularly adapted for use in the manufacture of terra cotta blocks.

The primary object of this invention is to provide a means for quickly and efficiently forcing a plastic mass intimately into contact with a mold.

Another object is to provide a machine which will accomplish this object and which at the same time permits of the use of molds of relatively fragile material.

Another object is to provide a molding machine which is as nearly automatic in its operation as possible.

These and other objects as will appear are accomplished by this invention which is fully described in the following specification and shown in the accompanying drawing in which Fig. 10 is a vertical longitudinal section through the center of the molding machine showing the mechanism for feeding the molds thereto and for removing the molds therefrom.

This invention is embodied in a machine consisting essentially of an enlarged chamber $20^a$ having doors 21 at each end which may be opened and closed, for the introduction of the molds. With these doors closed an explosive mixture of air and fuel such as gasoline or gas is introduced into the chamber and ignited as will later be explained, thereby producing a pressure which causes the clay or other plastic material to be forced intimately into the molds.

The main casting 20 is carried upon foundations 22 and 23 and has a series of lugs 24 at each side thereof in which are loosely journaled shafts 25 and 26 at each side of the main casting. These shafts project at both ends beyond the main casting 20 and support the hollow gaskets 27 and the end yokes 28. The doors 21 are mounted to slide up and down between the gaskets 27 and the end yokes 28 and contact rollers 29 which are mounted upon the upper shafts 25. These doors are quite heavy and are carried by guide rods $21^a$ which pass through a suitable guide 30 and are connected by a flexible member (not shown) with counter weights. The counter weight, however, is not as heavy as the door itself so that the door tends at all times to move to a closed position.

The shafts 25 and 26 are rotated first in one direction, and then in the opposite direction so as to accomplish two things as will herein be explained, namely, raising and lowering the doors 21 and drawing the end yokes 28 up against the doors so as to produce a close joint therebetween during the explosion of the combustible mixture.

On each of the shafts 26 are loosely mounted the two opposing split arms 31 which have rollers 32 mounted at their extremities and upon which roll the doors 21. It will be noted that the lower outer edges $21^b$ at the bottom of these doors are inclined somewhat toward the center so as to start the arms in as the door moves downward. A pin 33 passes through each of the arms 31 and is adapted to be engaged by the fingers 34 which are carried on the plates 35 and which in turn are keyed to the shaft 26.

Figure 4:
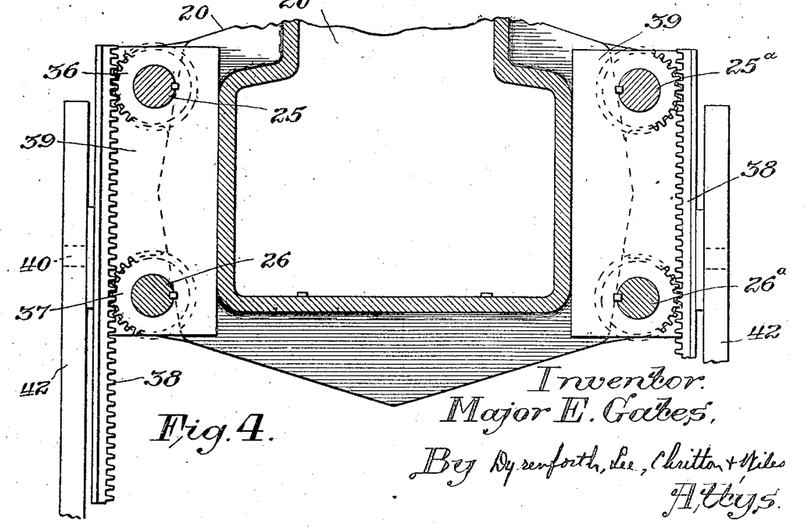
Fig. 4 is a similar partial section on the line 4—4 of Fig. 1 showing the horizontal shaft and gears in a position corresponding with that shown in Fig. 3.
Figure 5:
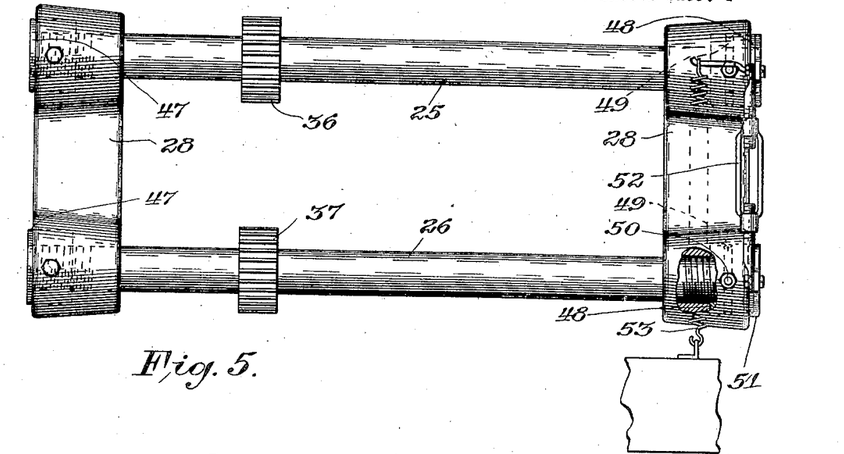
Fig. 5 is a detailed elevation of the two horizontal shafts at the sides of the machine showing the automatic take-up mechanism for equalizing the pressure on the tube.

Referring now to Figs. 4 and 5, the shafts 25 and 26 have gears 36 and 37 keyed thereto, both of which engage the racks 38.

Figure 1:
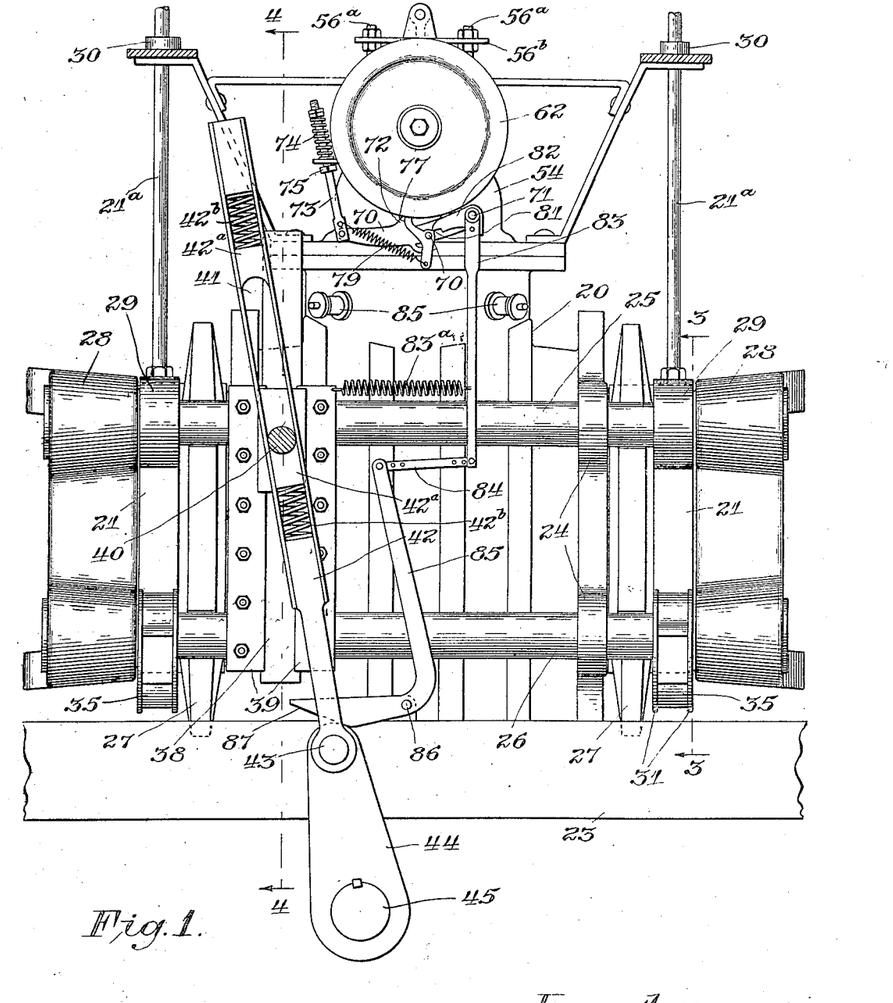
Fig. 1 is a side elevation of the molding machine.
Figure 2:
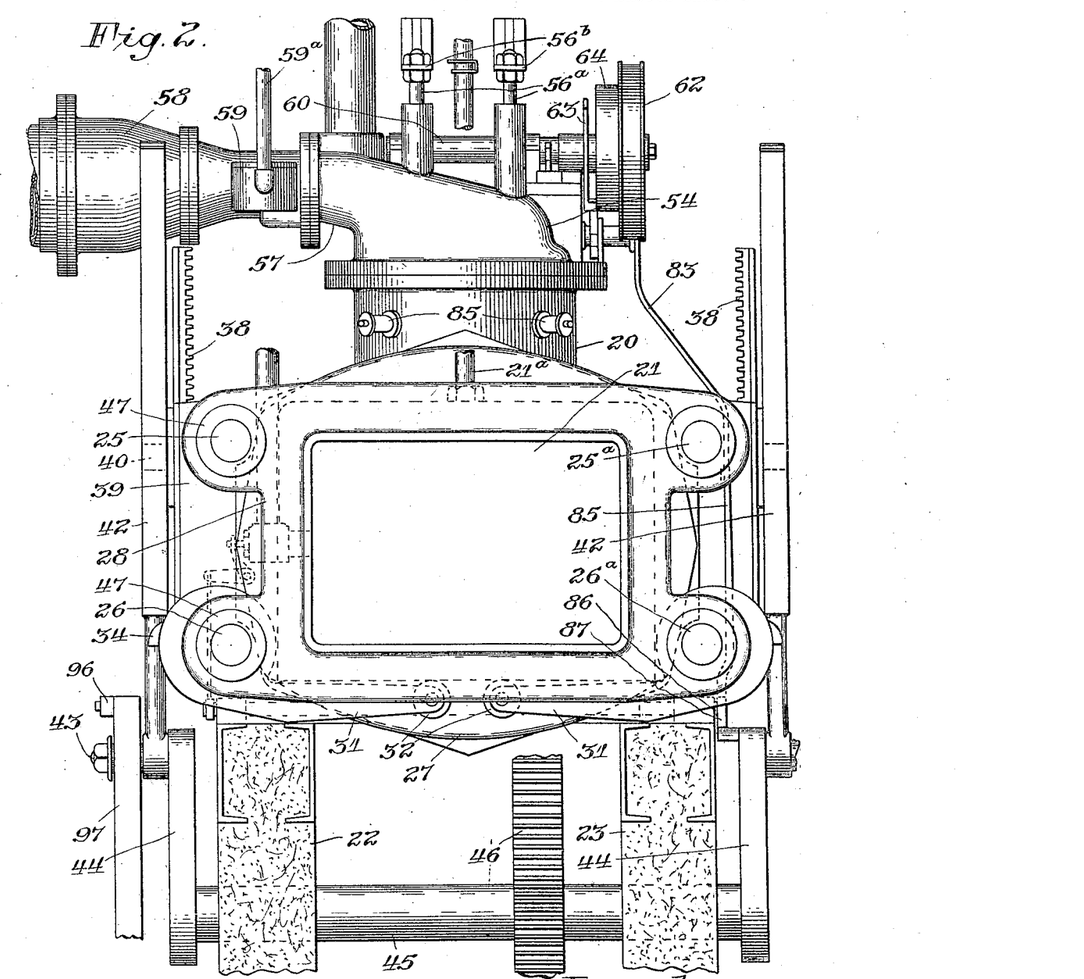
Fig. 2 is an end elevation of the same.
Figure 3:
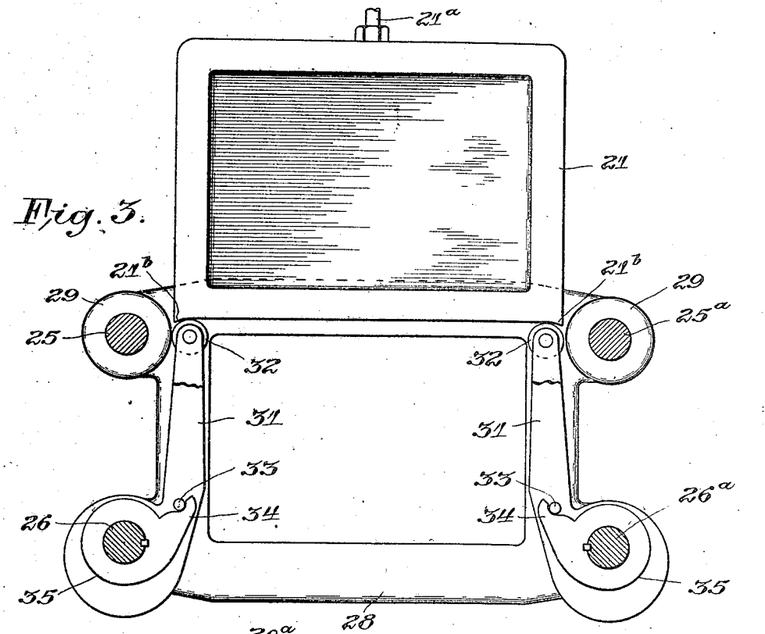
Fig. 3 is a partial vertical section on the line 3—3 of Fig. 1, showing one of the doors in elevated position.

These racks are slidable up and down in suitable guide ways 39 which are carried by the main casting 20. A pin 40 is carried by each of these racks which is pivoted in a long slot 41 into links 42 which is pivotally mounted at one end of the wrist pin 43. This wrist pin is carried on a crank 44 and that in turn on a shaft 45 as shown in Figs. 1 and 2. This shaft has a gear 46 keyed thereon which is driven by a pinion (not shown) from any suitable source of power. At each end of the long slot 41 is a block 42$^a$ behind which is placed a spring 42$^b$. These provide a steady but yielding pressure on the pin 40 and end on the shafts 25 and 26.

Each of the four shafts 25 and 26 is provided with a right hand screw thread at one end and a left hand screw thread at the other as shown in Fig. 5, the right hand threads are placed at the left hand of these shafts as shown in Fig. 5 and are threaded into nuts 47 which are secured in the left hand end yoke 28 in such a way as to prevent them from turning. Left hand nuts 48 are threaded upon the opposite end of the shafts 25 and 26 and have circular grooves 49 in which are placed set screws 50 so as to permit these nuts to turn in the right hand end yoke 28 but which at the same time are prevented from moving endwise therein. The shafts 25$^a$ and 26$^a$ on the opposite side of the machine are of course made the reverse of this.

Figure 6:
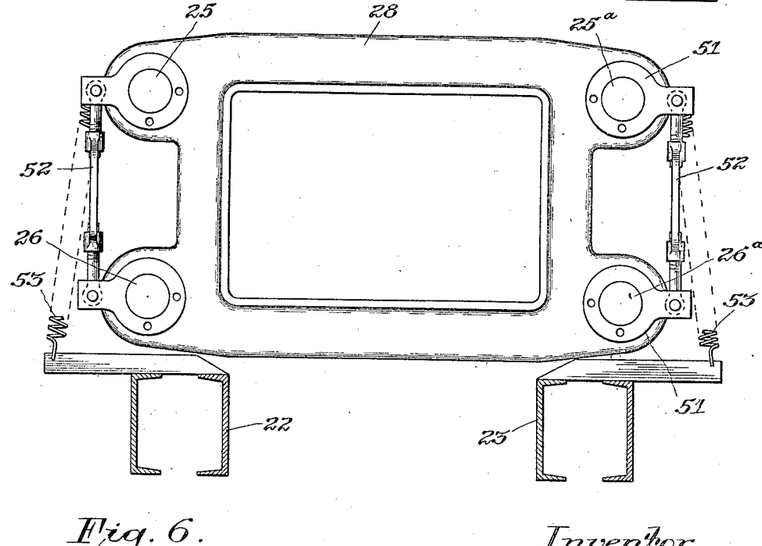
Fig. 6 is an end elevation showing this equalizing mechanism in detail.

As shown in Fig. 6 a lever 51 is secured to each of the nuts 48 and these levers are adjustably and hingedly secured to each other by means of links and a turn buckle 52. A spring 53 tends to maintain both sets in the position shown in Fig. 6. By adjusting the turn buckle 52 the bearing of the door 21 at the top and bottom may be changed so as to make them bear equally while the springs 42$^b$ provide an automatically equalizing means whereby the pressure applied by the shaft at the two sides of the molding machine will be equalized.

Figure 9:
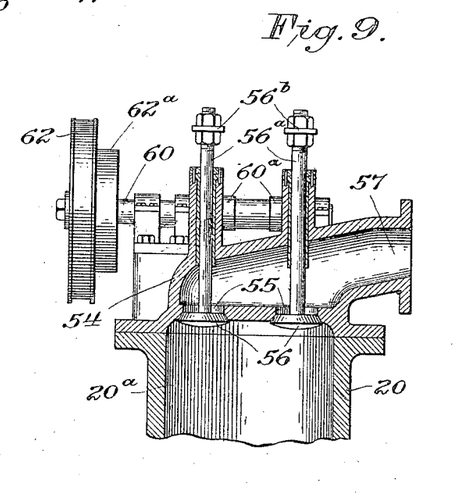
Fig. 9 is a partial vertical section on the line 9—9 of Fig. 8.

The upper part of the main casting 20 is closed by means of a cover or head 54 as shown in Figs. 1, 2 and 9 in which are a plurality of holes 55 which are normally closed by poppet valves 56. These openings communicate with the passage 57 which in turn communicates with the pipe 58 with a large air reservoir (not shown) which is maintained under a suitable air pressure.

A fuel reservoir 59 has a fuel nozzle (not shown) leading therefrom and communicating with the passage 57 in a well known manner. Fuel is supplied to the reservoir 59 through a pipe 59$^c$ and the level therein maintained in any well known way.

The valves 56 have valve rods 56$^a$ which extend vertically through the head and are connected in pairs by means of straps 56$^b$. An oscillating member 56$^c$ is pivotally connected at one end to the center of each of these straps and has a bifurcated lower end which is slidable upon a horizontal shaft 60 which is journalled in bearings carried by the head 54. The shaft 60 has a cam 60$^a$ corresponding to each pair of valves on which there is a roller 61 which is journalled upon a pin carried by the member 56$^c$. Thus, it will be seen, that as the shaft 60 is revolved the cam 60$^a$ will cause the valves 56 to be alternately raised and lowered.

Figure 7:
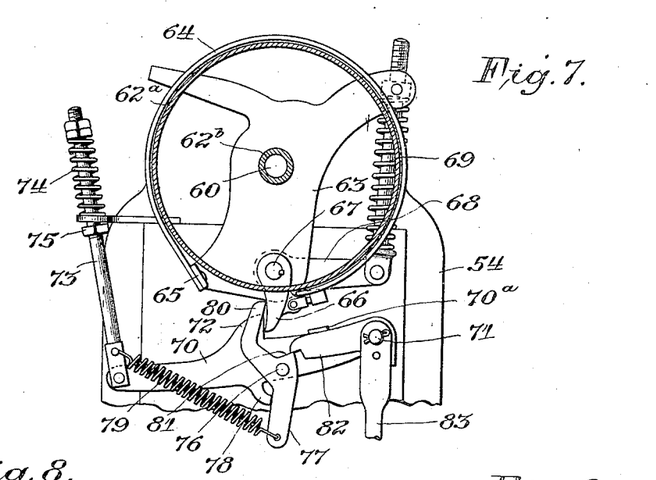
Fig. 7 is a detail of the trip mechanism for operating the valve cam shaft.
Figure 8:
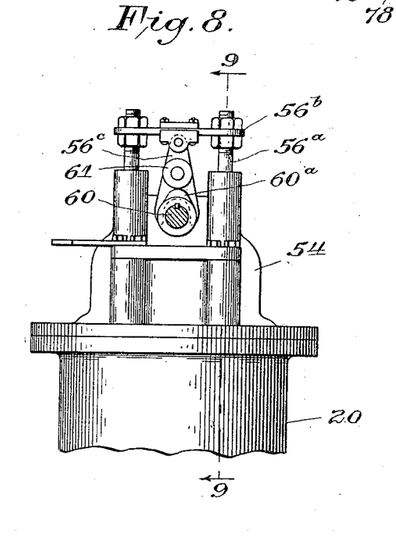
Fig. 8 is a side elevation of the head with valves therein.

A belt pulley 62 having a brake flange 62$^a$ and a hub 62$^b$ as shown in Fig. 7 is journalled on the outer end of the shaft 60. This pulley is driven at a high rate of speed preferably about 600 revolutions per minute by a belt from any suitable source of power such as an electric motor. A spider 63 is keyed to the shaft 60 and carries a brake band 64 one end of which is secured to the spider at 65, the opposite end being adjustably and pivotally secured to a finger 66 which is keyed on a shaft 67 which is journalled in the spider 63. The opposite end of the shaft 67 has keyed thereon a lever 68 which is pressed by a spring 69 which constantly tends to tighten the brake band 64 about the brake drum 62$^a$.

A pawl 70 is hingedly mounted on a pin 71 which is carried by the main casting 54. This pawl has a shoulder 72 which normally engages the finger 66 thus preventing the shaft 59 from turning except when the pawl 70 is released as will later be explained. This pawl is normally held in the position shown in Fig. 7 by the rod 73 and the spring 74. The stop 75 limits the upper swing of this pawl.

The pawl 70 carries a pin 76 on which is hingedly mounted a trip finger 77 which is normally held against the stop 78 by a spring 79. This trip finger has an extension 80 which projects beyond the shoulder 72 so as to engage the finger 66 after it has been released by the shoulder 72. The trip finger also has a sharp shoulder 81 which engages the end of a trip lever 82 which is pivotally mounted on the pin 71. A lever 83 is secured to the trip lever 82 and connects through a link 84 with the bell crank 85 which is pivotally mounted at 86. The opposite end of the bell crank 85 has an inclined surface 87 which lies in the path of the crank 44 and is engaged thereby as shown in Fig. 1.

It will be understood from the foregoing, therefore, that as the crank 44 revolves in a clock-wise direction, it will engage the inclined surface 87 forcing the bell crank 85 and the lever 83 to the right thereby swinging the operating lever 82 as well as the pawl 70 about the pin 71 compressing the spring 74. The pawl 70 will continue to swing downward until the shoulder 72 drops off the lower end of the finger 66, when this finger will move to the left under the action of the spring 69, thereby tightening a band 64 about the drum 62ª. At the same time, the finger 66 will engage the extension 80 of the trip lever 77 thereby causing it to move so that the shoulder 81 will swing out from beneath the end of the operating lever 82, thereby releasing the trip lever 77 and causing the pawl 70 to swing back to the position shown in Fig. 7, where it is again ready to engage the finger 66 as it completes its revolution about the shaft 60. Thus it will be seen that the shaft 60 is permitted to make but one revolution at each actuation. The lever 82 is returned by the spring 83ª and the spring 79 yields to permit this lever to pass and return to the position shown so as to be ready for the next tripping operation. The operating lever 82 is returned by means of the spring 83ª to the stop 70ª on the lever 70.

It will be understood that the actuation of the shaft 60 takes place after the doors 21 are closed and firmly tightened by means of the shafts 25 and 26. On each revolution of this shaft the valves 56 are opened and a charge of air and fuel admitted and the valves closed by means of the cam 60ª. About the time these valves are closed the combustible charge is ignited by means of a jump spark from the spark plugs 85. This as stated before is accomplished by means of electric contacts (not shown) carried by the shaft 60. Electrical contacts (not shown) are carried by the rod 21ª and a stationary part of the main frame which form a part of the ignition circuit so that the charge can be ignited only when the doors are fully closed.

In order to make the doors 12 as nearly gas tight as possible, gaskets 27 are inserted between the doors and the end of the chamber 20ª which are hollow as shown in Fig. 10. As the pressure within the chamber 20ª suddenly rises due to the burning of the mixture, pressure within the hollow gaskets 27 causes its sides to spread, pressing out against and conforming more nearly to the doors 21 and the ends of the chamber 20ª. It will thus be seen that this gasket which expands under pressure materially assists in holding the pressure within the chamber and preventing leakage of gas around the doors.

Figure 11:
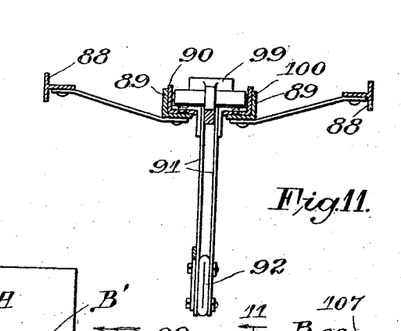
Fig. 11 is an enlarged transversed section on the line 11—11 of Fig. 10.
Figure 12:
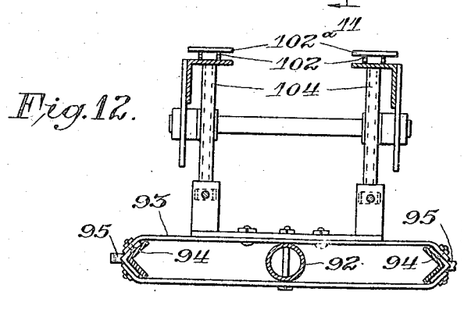
Fig. 12 is an enlarged vertical section on the line 12—12 of Fig. 10.
Figure 15:
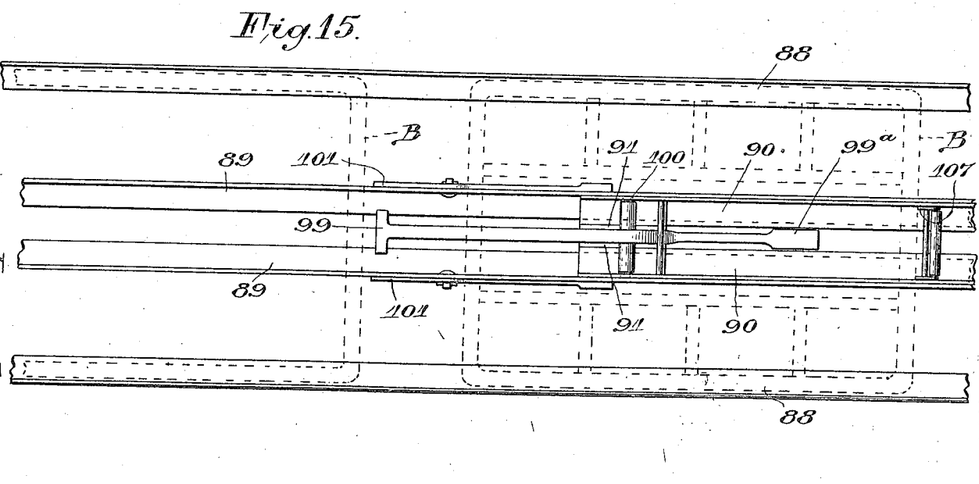

The molds A are placed upon trays B and are automatically moved to the molding machine by mechanism which will now be explained. While the molds A vary considerably in size and shape the trays B upon which the are carried must necessarily be of the same size, or at least of the same length. As shown in Fig. 10 these trays are made just a trifle shorter than the distance between the doors 21. Leading up to the molding machine is a run-way shown in Figs. 10, 11, and 15, consisting of parallel T-bars 88 which have parallel angle irons 89 spaced therebetween. The trays B which are preferably made up wth an angle iron frame are carried by these T-bars and angle irons as shown in Fig. 15. A frame 90 is slidable between the angle irons 89 and has secured thereto and descending therefrom a member 91 to the lower end of which is secured a rod 92 the opposite end of which is fastened to the slide 93. The latter is carried upon suitable guides 94 and has at each side a pin 95 upon which it hingedly mounted a link 96 which is pivotally connected to the upper end of an oscillating member 97 which is pivotally mounted at 98. This oscillating member is moved back and forth by means of the wrist pin 43 on the crank 44 operating in a slot 97ª therein. The frame 90 has pivoted thereto an actuating pawl 99 which is pivotally mounted at 100 which is normally held in the position shown by means of its weighted lower end 99ª. The pawl 99 and associated parts are at the extreme right end of their throw. Weighted retaining pawls 101 are placed even therewith as shown in Fig. 10.

Figure 13:
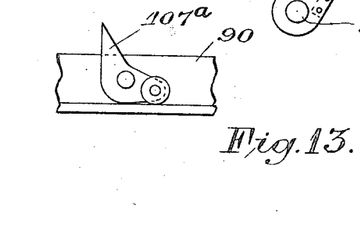
Fig. 13 is a detail of a retaining pawl.
Figure 14:
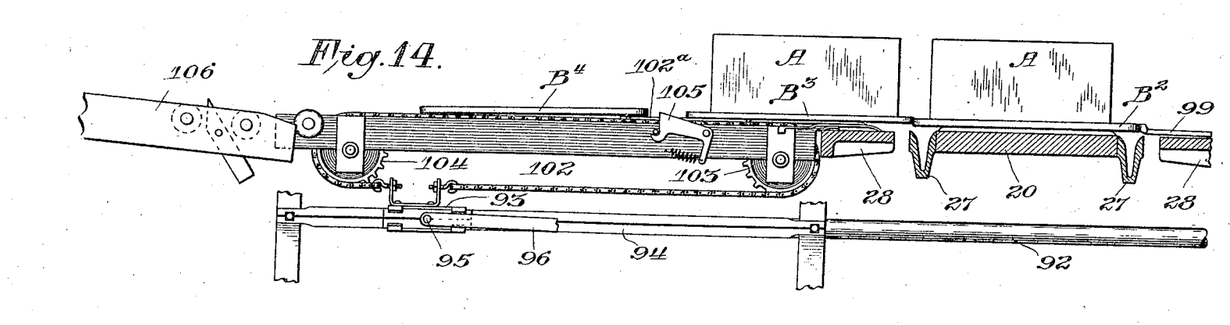
Fig. 14 is a view similar to Fig. 10 showing a continuation of the mechanism for removing the molds from the molding machine and Fig. 15 is an enlarged plan view of the mechanism for feeding the molds to the molding machine as shown in Fig. 10.

A means for moving the trays away from the molding machine is provided which consists of a chain 102 passing over sprockets 103 and 104 as shown in Figs. 10 and 14, and connected at its two ends to the slide 93. This slide is connected to the lower section of the chain so that the upper part of the chain 102 and the pawl 99, move in opposite directions. Slides 102ª are secured to the upper part of the chain and slide under the trays as they are pushed from the molding machine. A retaining pawl 107 is provided as shown in Fig. 10 to prevent the tray at B from being pushed backwards and a pawl 107ª, Fig. 13 is carried by the frame 90 and comes even with 107 when the frame is at its extreme position as shown in Fig. 10.

The method of operation is as follows:—

Molds are assembled upon the trays in the run-way at the right of the machine as shown in Fig. 10. Slabs of clay are then roughly fitted into the molds which are slid along the run-way, by hand until the tray is in the position B¹ beyond the retaining pawl 101. With the shaft 45 in operation the actuating pawl 99 drops as it passes to the right under the tray B¹ until it is past that tray at which time the weight causes it to move up behind the tray. As the rod 92 is then drawn to the left the actuating pawl 99 forces the tray B¹ towards the molding machine. The mechanism for operating the doors 21 is so timed that these doors are now fully open and the tray together with a mold thereon is forced into the molding machine into a position B². At the same time the actuating pawl 99 is being withdrawn, the doors 21 closed, and are tightened by means of the shafts 25 and 26 as previously explained.

The shaft 60 is then turned one revolution as previously explained thereby opening the valves 56 admitting a charge of air and combustible fuel and closing. This charge is then ignited greatly increasing the pressure within the chamber 20ª and forcing the clay into the molds more uniformly and carefully than can possibly be done by hand. The doors 21 are again opened and the actuating pawl 99 forces the tray B¹ forward until it strikes the tray B² when both of them are forced forward until the tray B¹ occupies the center of the molding machine in the position marked B² and the one previously in the molding machine is forced forward on the chain 102. Before the doors 21 drop the actuating pawl 99 pulls back from under them and at the same time the slide 102ª which is moving in the opposite direction slides under the tray B³ and the next reverse movement of the chain 102 draws the tray to the position shown at B⁴; as the actuating pawl 99 is moved back of the tray in the position B¹ the chain 102 at the same time moves forward with its tray until it is beyond the retaining pawl 105, to the position marked B⁴. The trays are then forced onto the run-way 106 where the molded block is carefully examined and trimmed. The mold is then opened and the molded block removed.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. A machine for pressing plastic material into molds comprising a chamber having an opening for the insertion of the mold, means for closing the opening, means for admitting gas to said chamber and means for suddenly increasing the pressure of said gas to force the plastic material into said mold.

2. A machine for pressing plastic material into molds comprising a chamber having an opening for closing the opening, means for admitting a combustible mixture to said chamber and means for igniting said mixture to press the plastic material into said mold.

3. A machine for pressing plastic material into molds comprising a chamber having an opening for the insertion of the mold, means for closing the opening, means for admitting a combustible mixture to said chamber, means for igniting said mixture to press the plastic material into said mold, and means for forcing said molds into and out of said chamber.

4. A machine for pressing plastic material into molds comprising a chamber having an opening for the insertion of the mold, means for closing the opening, means for admitting a combustible mixture to said chamber, means for igniting said mixture to press the plastic material into said mold, and means associated with the first mentioned means for forcing said molds into and out of said chamber.

5. A machine for pressing plastic material into molds comprising a chamber having openings at opposite sides thereof, doors movable to close said openings, a valve for admitting a combustible mixture to said chamber, means for igniting said mixture after said doors and valve are closed, means for inserting molds into the chamber thru one of said openings and means for withdrawing molds from the chamber thru the other openings.

6. In combination, a hollow casting forming a chamber, having openings at both ends, doors movable to close said openings, rods supported by said casting and extending along the sides of said doors and substantially at right angles to the plane of said doors, yokes carried by said rods beyond said doors and means for drawing said yokes toward each other to clamp said doors over the openings.

7. In combination, a hollow casting forming a chamber, having openings at both ends, doors movable to close said openings, rods suported by said casting and extending along the sides of said doors, and substantially at right angles to the plane of said doors, yokes carried by said rods beyond said doors, reverse screw threads on the opposite ends of said rods, nuts carried by the yokes and screwed on said rods, whereby when the rods are turned, the yokes draw the doors against the openings.

8. In combination, a hollow casting forming a chamber, having openings at both ends, doors movable to close said openings, rods supported by said casting and extending along the sides of said doors, means associated with said rods for exerting pressure on said doors, and means for equalizing the pressure on said doors.

9. In combination, a hollow casting forming a chamber having openings at both ends, doors movable to close said openings, rods supported by said casting and extending along the sides of said doors and substantially at right angles to the plane of said doors, yokes carried by said rods beyond said doors, reverse screw threads on the ends of said rods, nuts carried by the yokes and screwed on said rods, and arms movable by two of said rods to open and close said doors.

10. In combination, a hollow casting forming a chamber having openings at both ends, doors movable to close said openings, rods supported by said casting and extending along the sides of said doors and substantially at right angles to the plane of said doors, yokes carried by said rods beyond said doors, reverse screw threads on the ends of said rods, nuts carried by the yokes and screwed on said rods, and means movable by two of said rods to open and close said doors.

11. In combination, a hollow casting forming a chamber having openings at both ends, doors movable to close said openings, rods supported by said casting and extending along the sides of said doors and substantially at right angles to the planes of said doors, yokes carried by said rods beyond said doors, means movable by two of said rods to open and close said doors and means operable by said rods for clamping the doors.

12. In combination, a hollow casting forming a chamber having openings at both ends, doors movable to close said openings, rods supported by said casting and extending along the sides of said doors and substantially at right angles to the planes of said doors, yokes carried by said rods beyond said doors, means movable by two of said rods to open and close said doors and a yieldable gasket on the inner side of each door.

13. In combination, a hollow casting forming a chamber having openings at both ends, doors movable to close said openings, rods supported by said casting and extending along the sides of said doors and substantially at right angles to the planes of said doors, yokes carried by said rods beyond said doors, means movable by two of said rods to open and close said doors and a gasket on the inner side of each door which is expansible by pressure within the chamber.

14. In combination, a chamber having an opening, a closure for said opening and a hollow gasket, the interior of which communicates with the interior of said chamber, expansible by pressure within said chamber.

15. A machine for pressing plastic material into molds comprising a chamber having an opening for the insertion of the molds, means for closing said opening, and means for subjecting the plastic material and mold to a suddenly directly applied gaseous pressure to force the plastic material into the mold.

16. The method of pressing plastic material into a mold consisting of placing the plastic material in the mold and subjecting the plastic material and mold to a suddenly directly applied gaseous pressure to force the plastic material into the mold.

17. The method of pressing plastic material into a mold consisting of placing the plastic material in the mold, placing said mold and plastic material within a confined space, filling said confined space with a combustible mixture and igniting said mixture to force said plastic material into the mold.

MAJOR E. GATES.